(12) United States Patent
Tanaka

(10) Patent No.: US 7,805,022 B2
(45) Date of Patent: Sep. 28, 2010

(54) IMAGE PROCESSING APPARATUS, IMAGE PROCESSING METHOD AND COMPUTER PROGRAM

(75) Inventor: Mamoru Tanaka, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1124 days.

(21) Appl. No.: 10/923,815

(22) Filed: Aug. 24, 2004

(65) Prior Publication Data

US 2005/0047659 A1      Mar. 3, 2005

(30) Foreign Application Priority Data

Aug. 26, 2003   (JP)   ............... 2003-301036

(51) Int. Cl.
G06K 9/32      (2006.01)
G06K 9/34      (2006.01)
G06G 5/00      (2006.01)
H04N 5/222     (2006.01)
H04N 5/44      (2006.01)
G06F 3/048     (2006.01)

(52) U.S. Cl. .................. 382/298; 382/173; 382/176; 382/177; 345/660; 348/333.01; 348/561; 715/838; 715/835

(58) Field of Classification Search .............. None
See application file for complete search history.

(56) References Cited

U.S. PATENT DOCUMENTS 4,647,189 A * 3/1987 Fujiwara et al. ............... 355/55
4,920,384 A * 4/1990 Okamoto ..................... 399/86
5,034,991 A * 7/1991 Hagimae et al. ............ 382/209
5,086,346 A * 2/1992 Fujisawa ..................... 358/453

(Continued)

FOREIGN PATENT DOCUMENTS

JP            11-242542          9/1999

(Continued)

OTHER PUBLICATIONS

Allison Woodruff, Andrew Faulring, Ruth Rosenholtz, Julie Morrison, Peter Pirolli, "Using Thumbnails to Search the Web", Mar. 31-Apr. 5, 2001, CHI, vol. 3, No. 1, pp. 198-205.*

(Continued)

*Primary Examiner*—Vikkram Bali
*Assistant Examiner*—Michelle Entezari
(74) *Attorney, Agent, or Firm*—Fitzpatrick, Cella, Harper & Scinto

(57) ABSTRACT

The present invention allows a thumbnail display representing the outline of input images in a digital image printer to be made, in which it is determined whether an image is a first kind of image or a second kind of image, and if it is determined that the image is the first kind of image, a feature part of the first kind of image is enlarged in the thumbnail display to make the contents of image more understandable.

Also, the invention allows a thumbnail display representing the outline of input images in a digital image printer to be made, in which it is determined whether an image is a character image or a gradation image, and if it is determined that the image is the character image, a part of the character image is enlarged in the thumbnail display to make the characters more understandable.

9 Claims, 7 Drawing Sheets

U.S. PATENT DOCUMENTS

| | | | | |
|---|---|---|---|---|
| 5,434,953 | A * | 7/1995 | Bloomberg | 345/670 |
| 5,757,957 | A * | 5/1998 | Tachikawa | 382/176 |
| 5,805,294 | A * | 9/1998 | Furuoya | 358/296 |
| 5,848,182 | A * | 12/1998 | Kanamori | 382/171 |
| 5,848,185 | A * | 12/1998 | Koga et al. | 382/173 |
| 5,892,844 | A * | 4/1999 | Fujisawa | 382/177 |
| 5,986,718 | A * | 11/1999 | Barwacz et al. | 348/592 |
| 6,188,405 | B1 * | 2/2001 | Czerwinski et al. | 715/764 |
| 6,285,842 | B1 * | 9/2001 | Katamoto et al. | 399/81 |
| 6,298,173 | B1 * | 10/2001 | Lopresti | 382/305 |
| 6,332,038 | B1 * | 12/2001 | Funayama et al. | 382/190 |
| 6,628,833 | B1 * | 9/2003 | Horie | 382/173 |
| 6,791,709 | B1 | 9/2004 | Nakamura et al. | 358/1.18 |
| 6,993,185 | B2 * | 1/2006 | Guo et al. | 382/176 |
| 7,019,761 | B2 * | 3/2006 | Srinidhi et al. | 345/643 |
| 7,239,430 | B2 * | 7/2007 | Shiau et al. | 358/3.08 |
| 7,324,692 | B2 * | 1/2008 | Kanamoto et al. | 382/182 |
| 7,411,699 | B2 * | 8/2008 | Lee | 358/1.9 |
| 7,437,002 | B2 * | 10/2008 | Tanaka | 382/199 |
| 7,545,981 | B2 * | 6/2009 | Sprague et al. | 382/176 |
| 7,623,716 | B2 * | 11/2009 | Itonori et al. | 382/229 |
| 7,711,189 | B2 * | 5/2010 | Katsuyama et al. | 382/176 |
| 2001/0036314 | A1 * | 11/2001 | Yamaguchi et al. | 382/172 |
| 2001/0045463 | A1 * | 11/2001 | Madding et al. | 235/462.14 |
| 2002/0135621 | A1 * | 9/2002 | Angiulo et al. | 345/838 |
| 2003/0030678 | A1 * | 2/2003 | Rosenholtz et al. | 345/838 |
| 2003/0158843 | A1 * | 8/2003 | Boguraev et al. | 707/5 |
| 2004/0146199 | A1 * | 7/2004 | Berkner et al. | 382/176 |

FOREIGN PATENT DOCUMENTS

| | | |
|---|---|---|
| JP | 2001-63155 | 3/2001 |
| JP | 2002-288581 | 10/2002 |
| JP | 2003-224734 | 8/2003 |

OTHER PUBLICATIONS

JP 10093618 A Apr. 1998 Japan Yamamoto, Makoto.*

* cited by examiner

INPUT DATA     PREVIEW THUMBNAIL DISPLAY

INPUT DATA     PREVIEW THUMBNAIL DISPLAY

IMAGE PROCESSING APPARATUS, IMAGE PROCESSING METHOD AND COMPUTER PROGRAM

BACKGROUND OF THE INVENTION

1. Field of the Invention

The present invention relates to an image processing apparatus, an image processing method and a computer program for making a thumbnail display representing the outline of an image by enlarging a part of the image.

2. Related Background Art

There is a print preview function of allowing the user to confirm visually the print data on the display before printing to know how the produced print data is printed actually.

In the preview function, the user can know the contents of input images by observing a thumbnail display representing the entire images in reduction. This method is beneficial in making the image processing for a number of pages especially with a copier. In this case, many thumbnail images are often displayed side by side in a preview display area.

However, there were the following problems with the conventional methods of the preview function for a digital image input/output apparatus such as the digital copier.

That is, a purpose of displaying the image in thumbnail (simplified display part image) is not to arrange the reduced images simply but to summarize the image information of the input image over many pages to obtain the material for judgement. In the document that the input image contains a lot of character information such as the copy document, it is often difficult to understand the outline of page to be properly intended with the conventional thumbnail display for displaying one page of image in reduction, resulting in a problem that the page is apparently recognized as the character image.

Herein, when the document is described with the text data such as ASCII code, the user can know the outline of the contents of document by displaying its heading (caption), using a software program for the personal computers, for example. However, this facility is unavailable when the image read by a scanner or the general image photographed by a digital camera contains any character, because the caption is not prepared in the image data. Since there are many formats for the digital documents circulating in the world, the heading display of the text is limited, and in most cases, it is difficult to understand the outline of page, resulting in the problem that the page is apparently recognized as the character image.

Conventionally, when the user selects an enlargement mode to know the details of print image with the print preview function, the print image is displayed on the preview screen at the same resolution as that of the image in printing, and then the enlargement display position is specified manually by trial and error to confirm the details (Japanese Patent Application Laid-Open No. 2001-63155).

However, with the above method, when the thumbnail image is displayed in enlargement or reduction, the enlargement or reduction position and the scaling factor are set up manually, resulting in a lot of trial and error.

SUMMARY OF THE INVENTION

This invention has been achieved in the light of the above-mentioned problems, and it is an object of the invention to make a thumbnail display representing the outline of input images in a digital image printing apparatus by determining whether the image is a first kind of image or a second kind of image, in which if the first kind of image is determined, a feature part of the first kind of image is enlarged to make the contents of image displayed more clearly.

Also, in the light of the above-mentioned problems, it is an object of the invention to make a thumbnail display representing the outline of input images in a digital image printing apparatus, in which in the case of a gradation image, the entire image over the gradation area is displayed, while in the case of a character image, a part of the character image is enlarged to make the characters displayed more clearly.

In order to achieve the above object, according to the invention, there is an image processing apparatus comprising:

determination means for determining whether an image is a first kind of image or a second kind of image; and display means for making a thumbnail display in which a feature part of the first kind of image is enlarged, when it is determined that the image is the first kind of image based on a determination result of the determination means.

Further, according to the invention, there is provided an image processing apparatus comprising:

determination means for determining whether an image is a character image or a gradation image; and display means for making a thumbnail display in which a part of the character image is enlarged, when it is determined that the image is the character image based on a determination result of the determination means.

The invention aims at providing new functions. In order to achieve the above objects, the claims and other features of the invention will be clear from the following description and the drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE PREFERRED EMBODIMENTS

A preferred embodiment of the present invention will be described below with its principle. The embodiment based on the principle of the invention is illustrated to help to understand the invention, but the applicable scope of the invention is not necessarily limited by the details of the embodiment.

Figure 1:
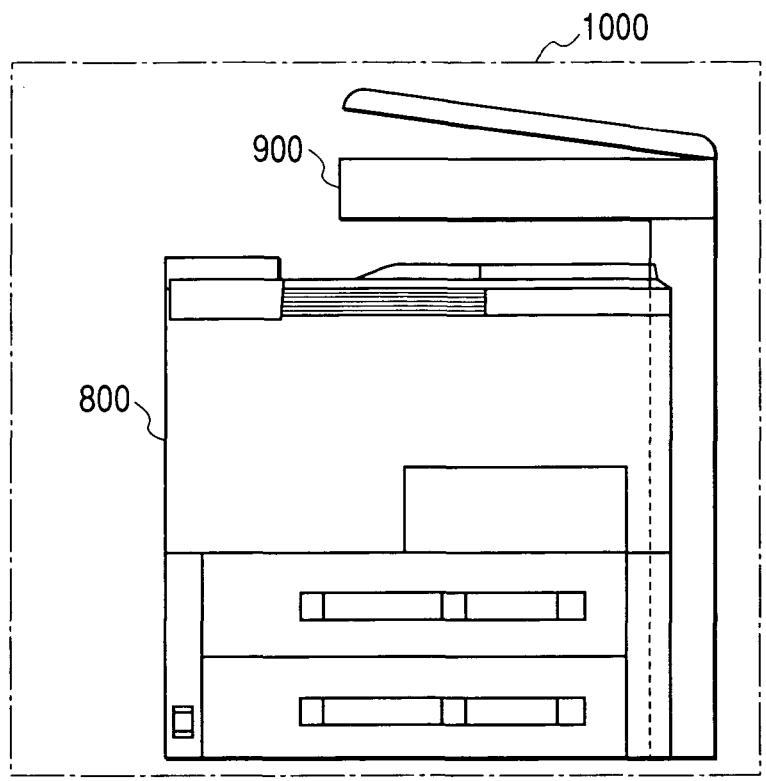
FIG. 1 is a view showing a digital image input/output apparatus according to an embodiment of the invention.
Figure 2:
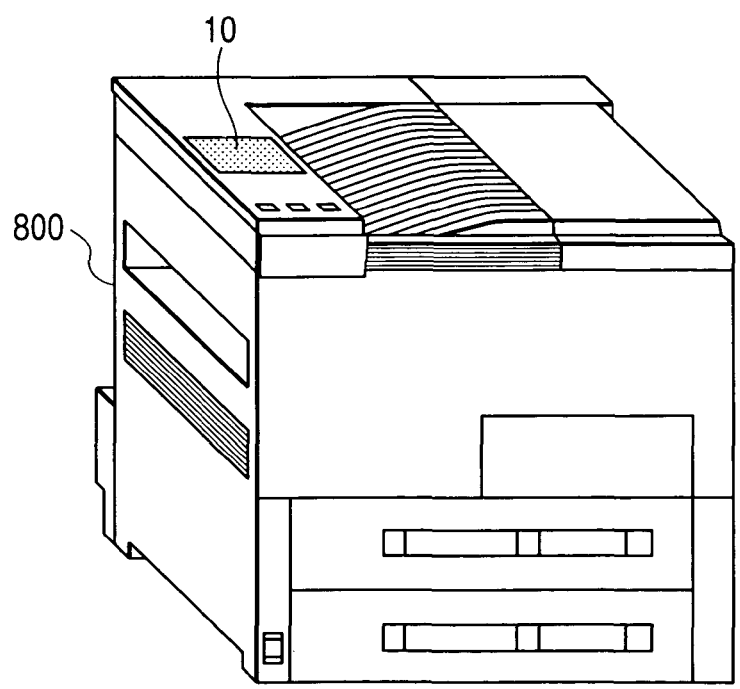
FIG. 2 is a view showing the digital image input/output apparatus according to the embodiment of the invention, as seen from above.
Figure 3:
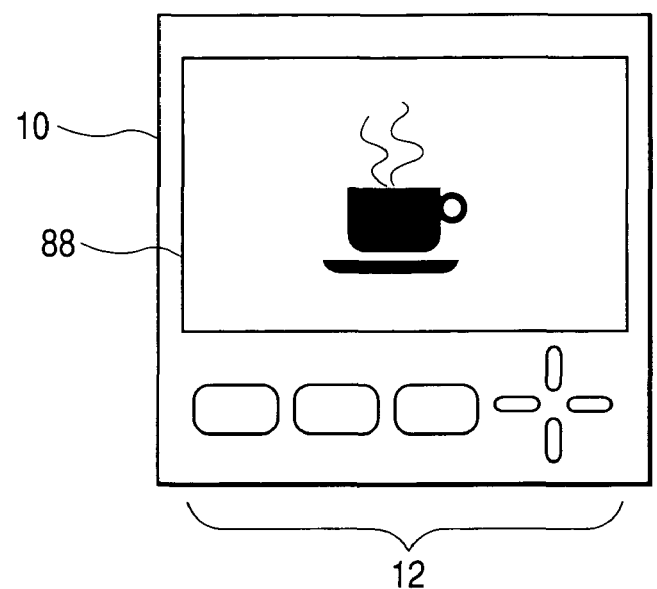
FIG. 3 is a view showing a display portion on an upper plane of the digital image input/output apparatus.
Figure 4:
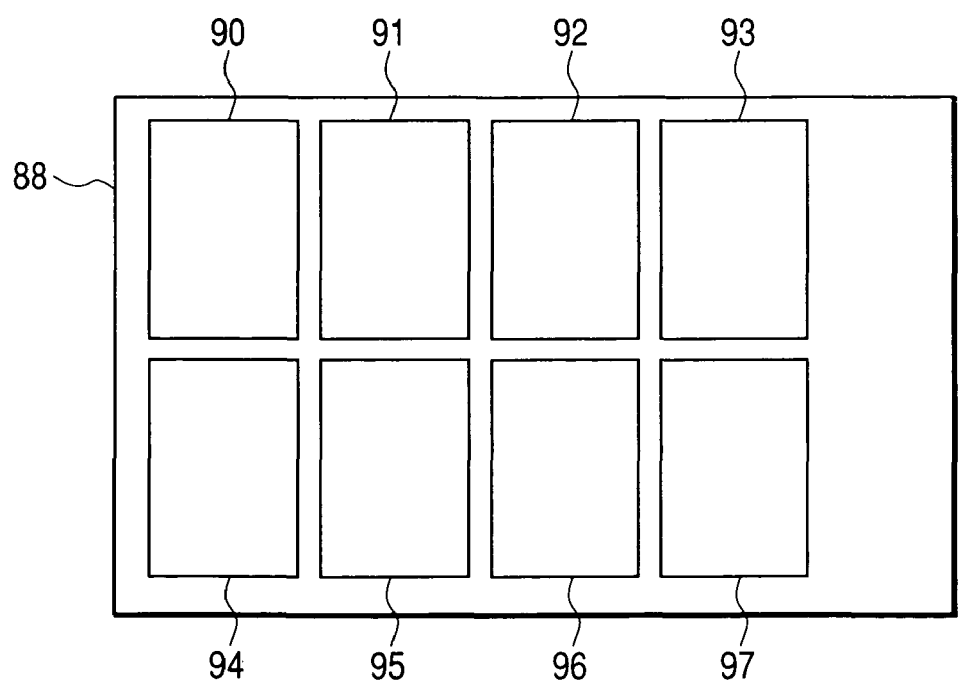
FIG. 4 is a view showing the small division windows for displaying in thumbnail a plurality of pages read from an image input unit on the display portion.

In FIGS. 1 and 2, reference numeral 1000 designates a digital image input/output apparatus, which is used to explain the embodiment of the invention. In this embodiment, the digital image input/output apparatus 1000 is composed of an image input portion (scanner portion) 900 and an image output portion (printer portion) 800. FIG. 3 is a view showing a display portion 10 on an upper plane of the image output portion 800 of FIG. 2, as seen from above. The display portion 10 displays a preview. The display portion 10 comprises a preview display portion 88 in an area thereof, and a user interface switch 12 arranged on the display portion 10. The display portion 10 has a pressure sensitive touch panel, and the user performs various kinds of operation by depressing the user interface switch 12. An image read from the image input portion 900 is displayed as a preview before being actually printed. The preview display portion 88 has a thumbnail display function. FIG. 4 shows a thumbnail display portion for displaying in thumbnail a plurality of pages read from the image input portion 900 on the preview display portion 88. The images of the plurality of pages are arranged in the small division windows 90 to 97. In FIG. 4, the eight thumbnail display windows are prepared for eight pages of images.

Figure 5:
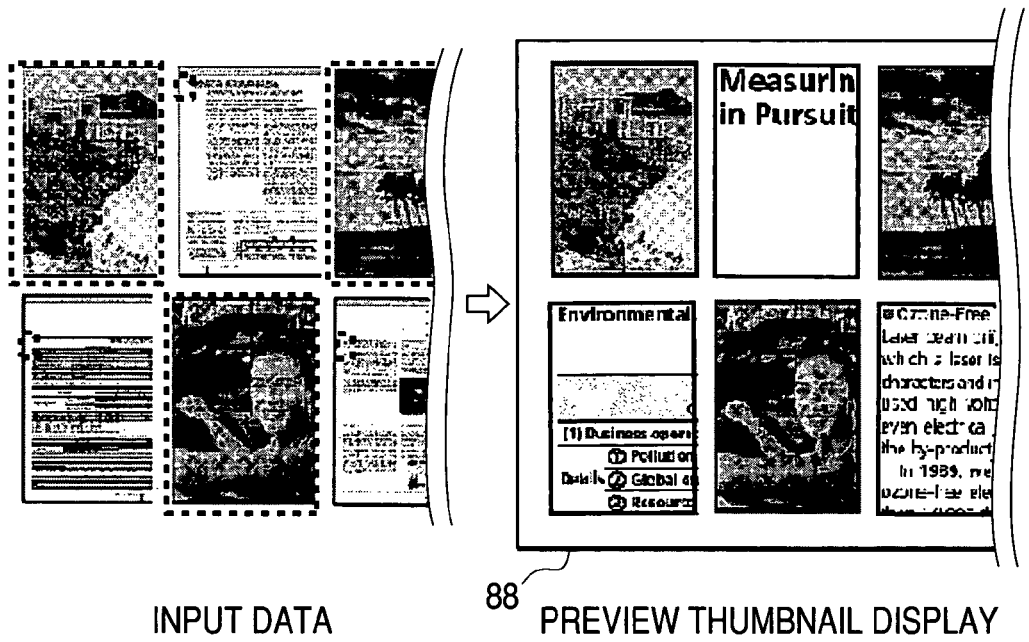
FIG. 5 is a view showing a preview thumbnail on the principal concepts according to the embodiment of the invention.

FIG. 5 is a view showing a basic principle of this embodiment. For the character image, in the thumbnails outlining the input page images, the heading of a sentence and its estimated parts are displayed at higher resolution to make it easier to understand the outline of pages. On the other hand, for the gradation image such as a natural image, the entire page is displayed to make it easier to understand the outline of page.

To explain additionally the basic principle of FIG. 5, the features and a detailed procedure of the embodiment of the invention are shown below as compared with the conventional example.

Figure 6:
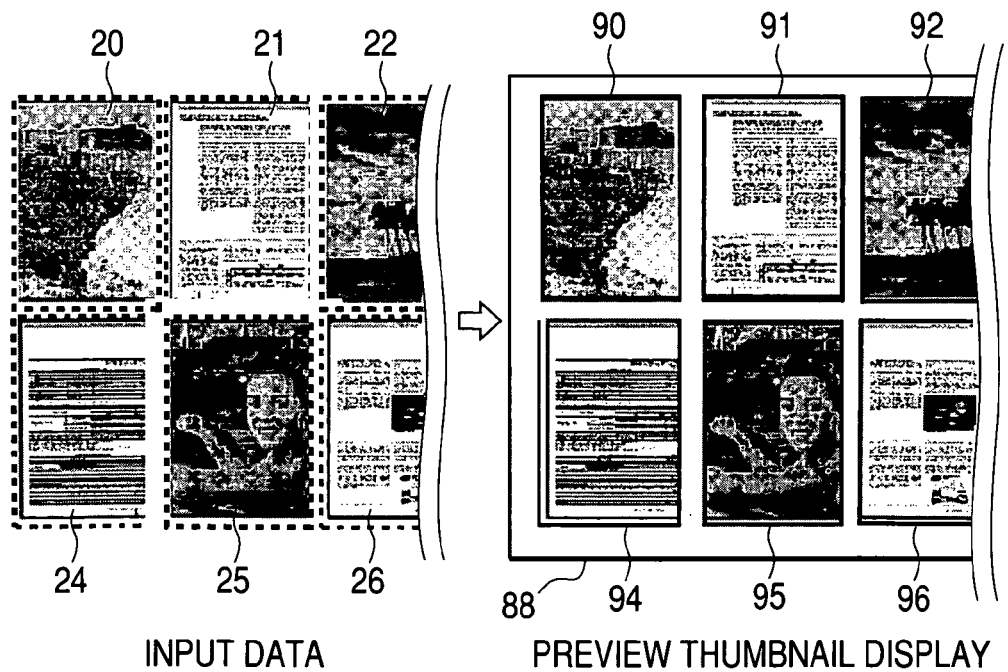
FIG. 6 is a view showing a conventional preview thumbnail.

FIG. 6 is a view showing a thumbnail display with the conventional preview. In FIG. 6, eight pages of image data that are input page images are represented as input images 20, 21, 22, . . . , and 27, input images 23 and 27 being omitted in the figure. These input images are displayed as thumbnail images in the areas surrounded by the dotted line, namely, in the small division windows 90 to 97 by reducing the entire image of each page as illustrated.

To outline a plurality of read images, conventionally, the entire pages of input images were displayed in reduction, as shown in FIG. 6. In this case, the user can properly understand the contents of input image data for the gradation image such as input images 20 and 22. However, when the character image data such as input images 21 and 24 is read, there is less effect for understanding the outline of the contents which is a purpose of the preview display, although it is understood that the data is mainly composed of characters in the thumbnail display areas 91 and 94.

Figure 7:
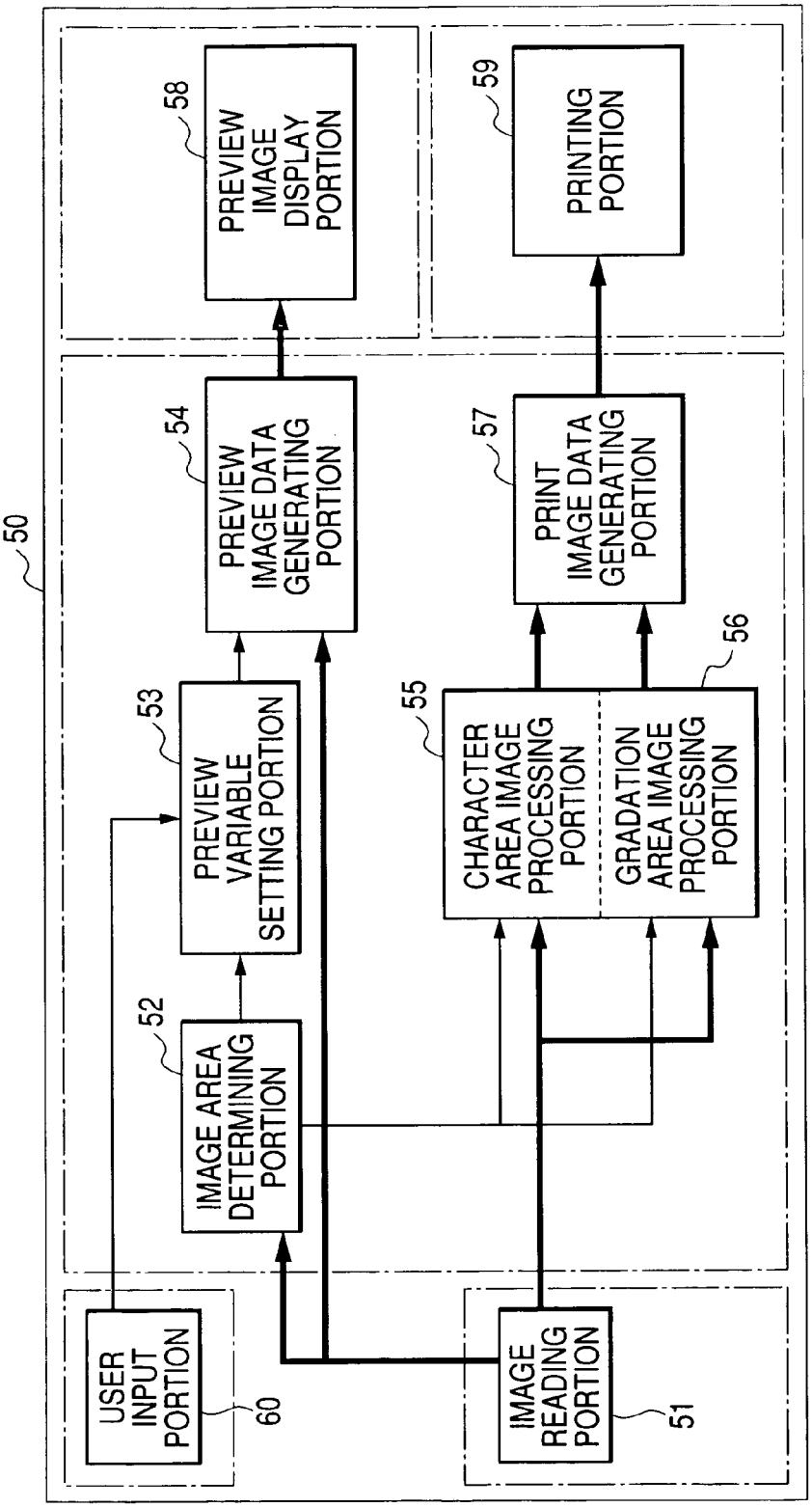
FIG. 7 is a block diagram showing an apparatus configuration according to the embodiment of the invention.

Thus, in this embodiment, the apparatus operates as shown in FIG. 7, thereby implementing the functions of FIG. 5 to allow the user to understand the contents of page.

FIG. 7 is a block diagram showing an apparatus configuration. In the block diagram of this embodiment, the relevant components of the invention are extracted. Though the actual physical configuration (a signal processing LSI, a printed board, a mechanical portion of printing apparatus and so on) does not necessarily correspond one-to-one to the logical block, the principle of the invention brings about the same effect.

Reference numeral 50 designates a block of the entire apparatus. The apparatus 50 comprises an image reading portion 51, an image area determining portion 52, a preview variable setting portion 53, a preview image data generating portion 54, a character area image processing portion 55 for performing the image processing for printing, a gradation area image processing portion 56 for also performing the image processing for printing a print image data generating portion 57 for generating the print image data, a preview image display portion 58, a printing portion 59, and a user input portion 60.

In FIG. 7, the arrow of heavy line indicates the flow of image data, and the arrow of fine line indicates the flow of control signal related with the invention.

For one page of image read by the image reading portion 51, the image area determining portion 52 determines whether it is character image such as a report, or gradation image such as a natural image or landscape. The read digital image is given an attribute of character image or gradation image by the image area determining portion 52.

Figure 8A:
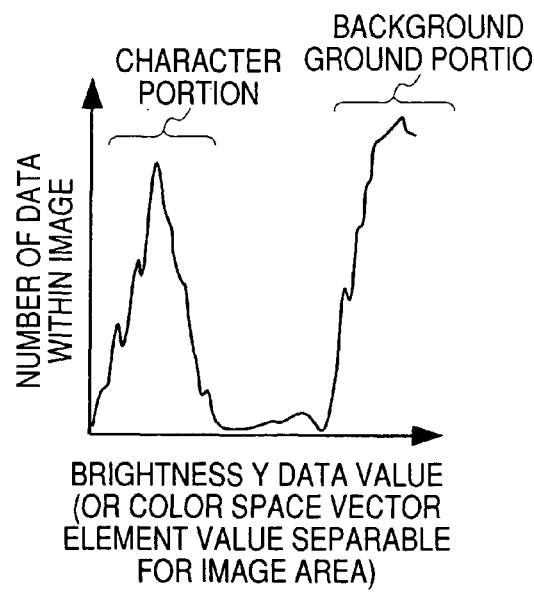
FIGS. 8A and 8B are charts showing the operation of an image area separating portion.
Figure 8B:
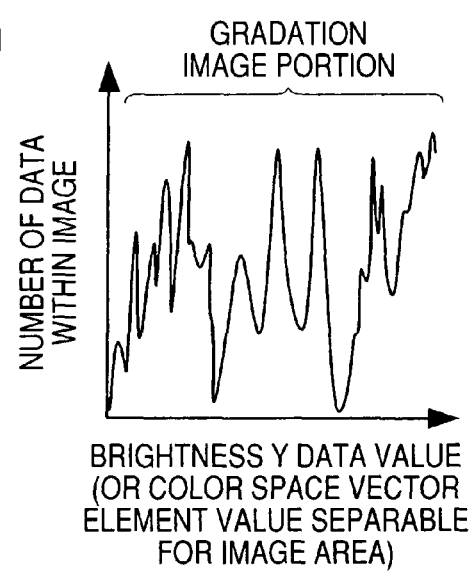

As an example of this method, a histogram of image data values is calculated as shown in FIGS. 8A and 8B. Thereby, it is possible to determine whether the image is character image or gradation image. FIG. 8A is a histogram of image data for the character image, and FIG. 8B is a histogram of image data for the gradation image such as landscape. The transverse axis represents the brightness Y data value, and the vertical axis represents the number of data within the image. In FIG. 8A, a peak of the number of image data takes place in each of a high brightness portion and a low brightness portion. In this histogram, the high brightness portion is determined as a background white ground, and the low brightness portion is determined as a black part of character, whereby this image data is estimated or determined as the character image. Also, in FIG. 8B, the number of image data is uniformly distributed. Therefore, in this histogram, since the image data without features of character image and having some gradation is distributed, this image data is estimated or determined as the gradation image.

Based on this determination result, an image processing for the image data is performed corresponding to the attribute. When the attribute of read digital image is character image, the image processing optimized for the character image is performed in the character area image processing portion 55. The image processing optimized for the character image is made, using a printing unit of electrophotography, in such a way that the character data is displayed in dots of high definition according to the physical maximum resolution of the printing unit, and in binary values with high contrast to produce stable small dots. Also, the digital image processing optimized for the gradation image may be made using the printing unit of electrophotography in such a way that the resolution is lowered to increase the area within one dot, unlike the character image, thereby stabilizing the multi-value gradation representation with the area ratio within one dot. These methods are well known as the printing techniques for electrophotography. In this way, the image data processed into appropriate representation after determining the image area is corrected for gradation curve with a look-up table in the print image data generating portion 57. Thereby, the image data is represented as one digital image data about to be outputted, and passed to the printing portion 59 for performing the printing on the paper.

Herein, in this embodiment, the image area determining portion 52 determines the image area by the histogram calculation for a certain image area. For this determination area, one page may be divided into rectangular sections to make the image area determination for each divided area. The image area determination result for each rectangular section is held in the apparatus, and the determination result for the entire page is decided by integrating the determination result for each divided area.

In this embodiment, a preview function of making the preview display using the digital image data read by the image reading portion 51 is implemented. The preview function in this embodiment has the enlargement or reduction (zoom) of read image, and the up, down, left and right movement of display position (XY coordinates) in the display area. By changing the preview variables, the corresponding image is displayed on the preview image display portion 58.

Figure 9A:
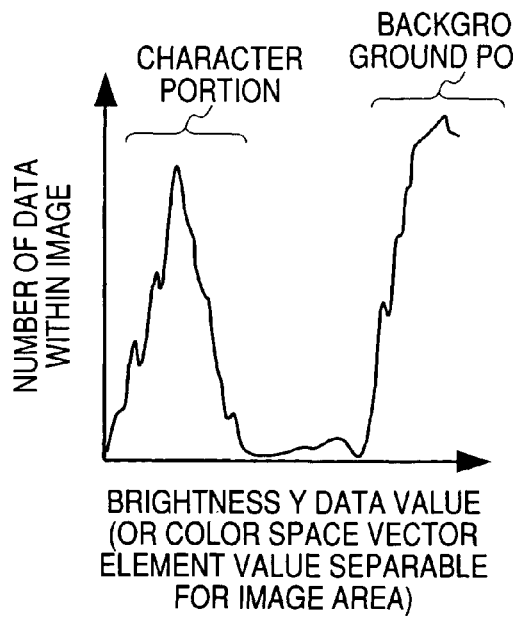
FIGS. 9A and 9B are charts for determining the initial character position in a character area.
Figure 9B:
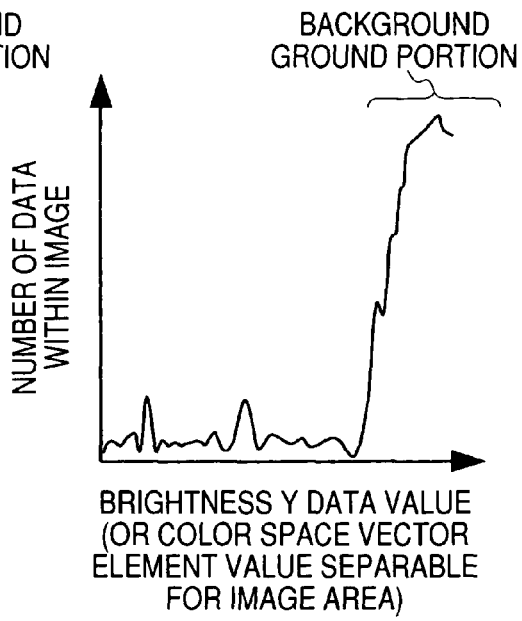

The input image data is given an attribute of character image or gradation image by the image area determining portion 52. The preview variable setting portion 53 initializes the preview variables by referring to this attribute to be used for the thumbnail display. The preview variable setting portion 53 operates as follows. When the result of determining the image area is gradation image, the scaling (zoom) factor is made minimum for the page to display the entire page as the thumbnail. In this embodiment, the scaling factor ranges from 100% (minimum) to 800% (maximum). In this gradation image, the scaling factor is 100%. The value of 100% indicates the setting of magnification in which the entire page is displayed at 100% in the thumbnail display window. The display position (XY coordinates) is not concerned in the case, because of the total display. The user may set up any value as the scaling (zoom) factor, using the user interface 12, whereby that value is set as the initial setting in the preview variable setting portion 53, and the thumbnail display is always made at the set value. On the other hand, when the result of image area determination is character image, the scaling (zoom) factor is equalized to a predetermined enlargement ratio. Herein, 800% is supposed as a reference example. In this case, the image is enlarged, and partially displayed, whereby it is required to decide the display position. The user can set up any scaling (zoom) factor using the user interface 12 in the same way as the gradation image. That value is set as the initial value in the preview variable setting portion 53, and the thumbnail display is always made at the set value. Referring to FIGS. 9A and 9B, this method in this embodiment will be described below.

FIGS. 9A and 9B show the histograms of the area that is determined as the character image area in the image area determining portion 52. FIG. 9A is a histogram of the area that is determined as the character area, in which the number of data has two peaks in the character portion and the background ground portion. On the other hand, in the histogram of FIG. 9B, the background ground portion is only seen in this area, whereby this area is determined as the background white ground portion. The display position in preview enlargement display is decided based on this determination.

Figure 10A:
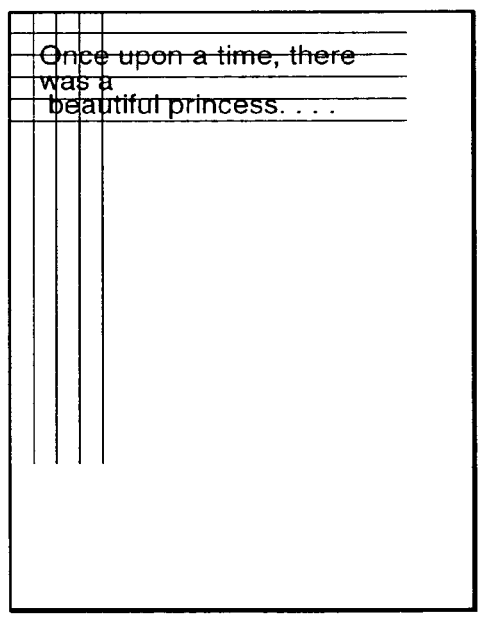
FIGS. 10A and 10B are views showing a method for area division in determining the image area of character image.
Figure 10B:
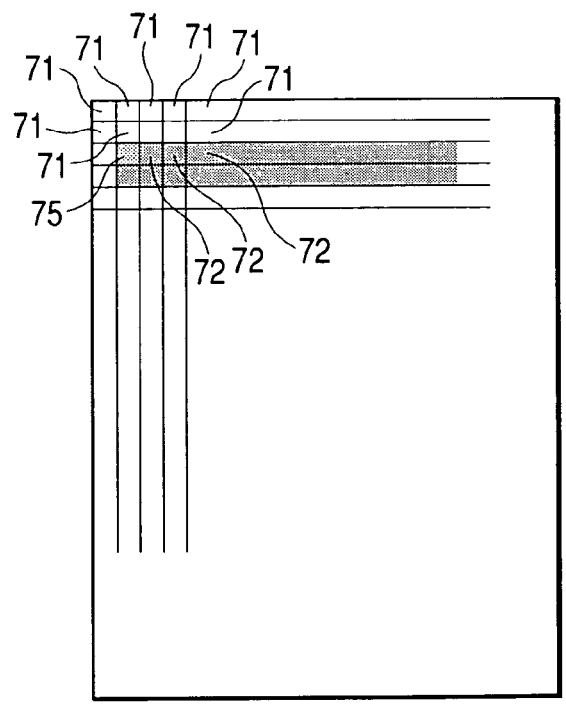

FIGS. 10A and 10B show a determination method for one page of image. FIG. 10A shows an area division method for use in determining the image area of character image, in which one page is divided into small rectangular divisions, as shown in the figure, and for each rectangular division, the determination of FIG. 9A is made to distinguish between the background portion and the character portion. In FIG. 10A, the character portion is in the rectangles where "Once upon a time . . . " exists and the background portion is in the blank rectangles. In FIG. 10B, the determination result for each rectangular division is shown. In FIG. 10B, 71 designates a background rectangular portion, and 72 and 75 designate the character existent rectangular portions. Herein, in this embodiment, the image of one page is sequentially scanned from the left upper position in the horizontal direction to determine whether each rectangular division is the background portion or the character existent portion. If the right end is reached, the line is lowered one in the vertical direction, and the image is scanned from the left end again to determine whether each rectangular division is the background portion or the character existent portion in the horizontal direction. By repeating this operation, the first character existent rectangular division is decided. As a result, the character existent rectangular division 75 is found, whereby the display position in preview enlargement display is decided at the position 75. In this embodiment, the preview display position (XY coordinates) is set to indicate the left upper coordinates of the preview display.

Figure 11:
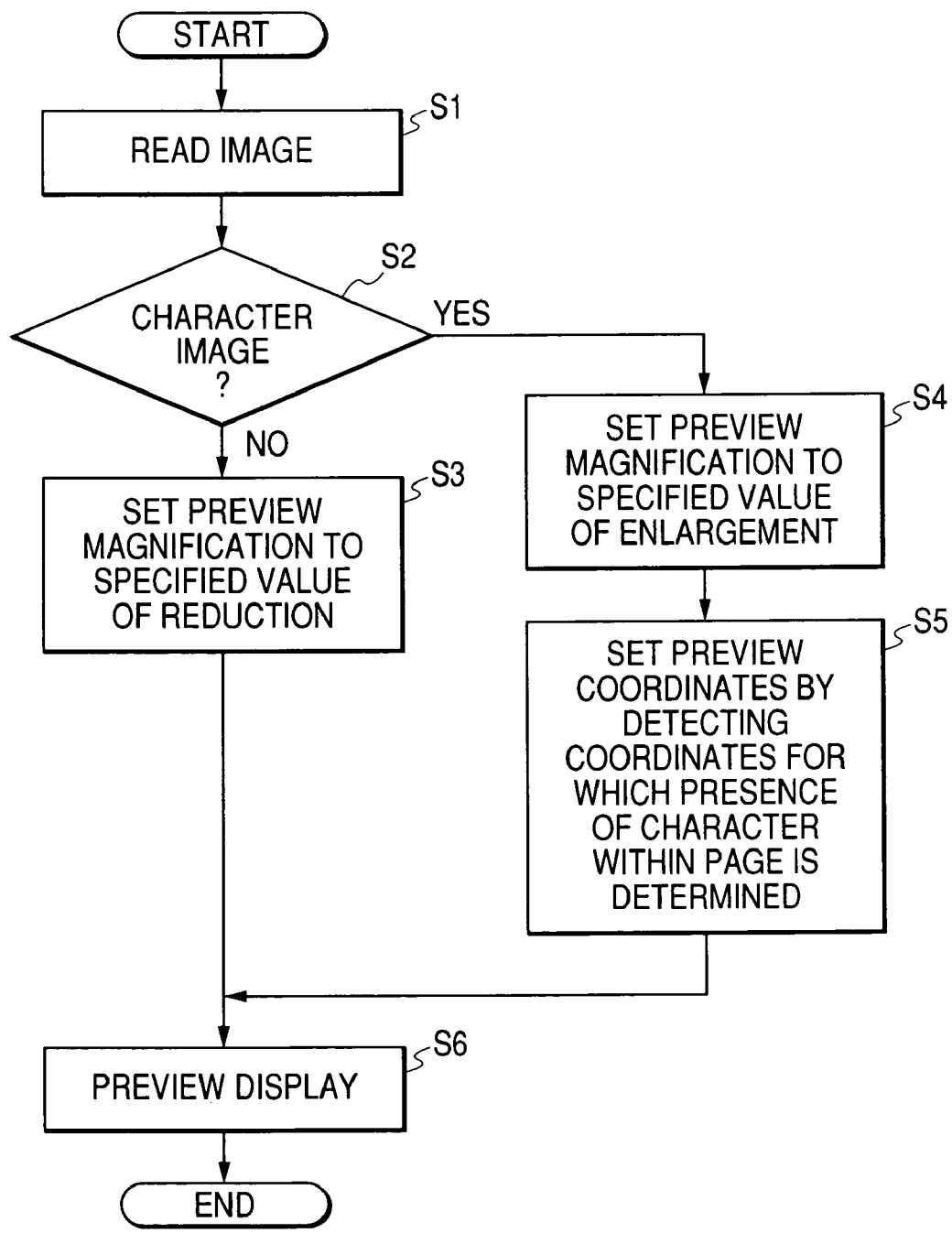
FIG. 11 is a flowchart showing a processing procedure of the embodiment of the present invention.

FIG. 11 is a flowchart showing a processing procedure of the digital image input/output apparatus 1000. In FIG. 11, first of all, an image is read at step S1. Then, at step S2, a determination for image area is made whether the image is character image or gradation image in the histogram of FIGS. 8A and 8B. In the case of gradation image, the preview magnification is set up at step S3. On the other hand, in the case of character image, the preview magnification is set at step S4, and the preview coordinates are set by detecting the coordinates at which the character exists within the page, using the histograms of FIGS. 9A and 9B at step S5. The preview display is made using the set values at step S6.

The control of FIG. 11 is made for each read page, and the thumbnail is displayed corresponding to each page. FIG. 5 shows this principle. In FIG. 5, a portion of input data indicated by the dotted line is displayed as thumbnail, whereby there is the greater effect of FIG. 5 than the conventional example of FIG. 6.

Though the scaling factor and the display position are set up by the method to make the preview display, the user may set the scaling factor and the display position manually to inspect the contents in more detail after the preview display.

Though in this embodiment, each rectangular area in one page of image is sequentially scanned from the left upper position in the horizontal direction, the image may be scanned from any other position than the left upper position in any direction. Also, though in this embodiment, the preview display position is the left upper position, it may be set at any other position than the left upper position.

Also, "readable" as used in the embodiment means that the characters are displayed in a size large enough for the user to read.

With the configuration of this embodiment as described above, using the thumbnail function of representing the outline of input page images in the digital image printing apparatus, the entire image is displayed and recognized in the case of gradation image. Also, in the case of character image, the beginning of the sentence and its estimated parts are displayed at high resolution to recognize the character, whereby an essential purpose "understanding the outline of pages" of the thumbnail display is easily achieved.

Though conventionally, the understanding of the contents in character display was allowed only by using a document for computer software containing the text information, the outline of pages may be appropriately understood at high probability even with the scanned image read as bit map from the scanner.

Moreover, the character recognition of high precision such as OCR (optical character recognition) is not required as the absolute requirements. As to the character image thumbnail display, whether its display is adequate or due to false recognition depends on the sentence understanding ability of the person. From the practical point of view, the recognition success ratio corresponding to the cost performance may be satisfied (the image should be displayed effortfully despite the recognition error). As a result, no apparatus for the image area separation or the preview variable setting specific to the invention is required. The conventional image area separation function for printing is reused, and added to the existing system without changing the constitution of the existing image processing system to implement the functions of the invention.

Though in this embodiment, the thumbnail display of image data within the image processing apparatus has been described above, the invention may be applied to the preview display of the print preview for preliminarily displaying the image before printing on the display of PC, or the thumbnail display portion on the display for the digital camera.

Other Embodiments

In a basic form of the above embodiment, the zoom magnification is defined from the size of characters employed on average in the general circulating images regarding the character image mainly composed of characters. However, the zoom magnification may be changed according to the detected original size, because there is the high possibility that no extremely large characters are employed in the small original such as postcard or card.

In this case, the specified zoom magnification may be decided from the statistical data produced by collecting the size of characters employed on average in the generally circulating image for each original size from various sample images in one embodiment.

In other embodiments, when the OCR (optical character recognition) is mounted and operated at high sped because there is a relative margin in the cost of the apparatus, the OCR is employed instead of the image area separation portion, to determine the character position and size correctly. Thereby, the preview variables are decided correctly to increase the precision of the thumbnail display for the character image.

As described above, in the thumbnail display of the image data within the image processing apparatus according to this embodiment, the character is enlarged and partially displayed to be more understandable in the case of the character image, whereas the entire image over the gradation area is displayed to understand the displayed image in the case of the gradation image.

Though the preferred embodiments of the invention have been described above, the invention is not limited to those embodiments, but it will be clear that various variations or modifications may be made within the scope of the claims.

This application claims priority from Japanese Patent Application No. 2003-301036 filed Aug. 26, 2003, which is hereby incorporated by reference herein.

What is claimed is:

1. An image processing apparatus comprising:
   read means for reading an original document;
   determination means for determining whether the original document read by the read means is characterized as a character image or a gradation image; and
   display means for making a thumbnail display based on the determination means, wherein:
   (a) a portion of the character image is used as the thumbnail display when the original document is characterized as a character image, with the display means selecting the portion of the character image that is used as the thumbnail display by dividing the original document into a plurality of divisions, sequentially scanning the original document, determining if each divided portion is a background portion or a character portion, and deciding which is a first division in which a character exists, and
   (b) the gradation image is used as the thumbnail display when the original document is characterized as a gradation image.

2. An image processing method comprising:
   a read step for reading an original document;
   a determination step of determining whether the original document read in the read step is characterized as a character image or a gradation image; and
   a step of making a thumbnail display based on the determination made in the determination step, wherein:
   (a) a portion of the character image is used as the thumbnail display when the original document is characterized as a character image, with the display step selecting the portion of the character image that is used as the thumbnail display by dividing the original document into a plurality of divisions, sequentially scanning the original document, determining if each divided portion is a background portion or a character portion, and deciding which is a first division in which a character exists, and
   (b) the gradation image is used as the thumbnail display when the original document is characterized as a gradation image.

3. A computer program stored on a computer-readable medium for causing a computer to execute an image processing method according to claim 2.

4. An image processing apparatus according to claim 1, wherein when the determination means determines that the original document is characterized as a character image, the display means enlarges a portion of the character image used as the thumbnail display based on a zoom magnification set in accordance with a size of the original document and displays the enlarged portion as the thumbnail display.

5. An image processing apparatus according to claim 1, further comprising detection means for detecting a size of the original document read by the read means, wherein when the determination means determines that the original document is characterized as a character image the display means enlarges a portion of the character image based on a zoom magnification set in accordance with (i) the size of the original document detected by the detection means and (ii) statistical data of sizes of characters employed on average for the detected size of the original document, and displays the enlarged portion as the thumbnail display.

6. An image processing apparatus according to claim 4, wherein after the display means makes a thumbnail display the user is allowed to re-set the zoom magnification or a position on which the thumbnail display is made.

7. An image processing method according to claim 2, wherein when the determination step determines that the original document is characterized as a character image, the display step enlarges a portion of the character image used as the thumbnail display based on a zoom magnification set in accordance with a size of the original document, and displays the enlarged portion as the thumbnail display.

8. An image processing method according to claim 2, further comprising a detection step of detecting a size of the original document read in the read step, wherein when the determination step determines that the original document is characterized as a character image the display step enlarges a portion of the character image based on a zoom magnification set in accordance with (i) the size of the original document detected by in detection step and (ii) statistical data of sizes of characters employed on average for the detected size of the original document, and displays the enlarged portion as the thumbnail display.

9. An image processing method according to claim 7, wherein after the display step makes a thumbnail display the user is allowed to re-set the zoom magnification or a position on which the thumbnail display is made.

* * * * *